United States Patent
Inagaki et al.

(10) Patent No.: US 8,618,709 B2
(45) Date of Patent: Dec. 31, 2013

(54) ROTARY ELECTRIC MACHINE WITH IMPROVED ENERGY EFFICIENCY

(75) Inventors: Tomohiro Inagaki, Nishio (JP); Ken Takeda, Anjo (JP); Shinichi Otake, Kota (JP); Tsuyoshi Miyaji, Toyohashi (JP); Yuta Watanabe, Nishio (JP); Ryosuke Utaka, Takahama (JP); Shinya Sano, Toyota (JP); Takeshi Tomonaga, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 206 days.

(21) Appl. No.: 13/053,687

(22) Filed: Mar. 22, 2011

(65) Prior Publication Data

US 2011/0241468 A1    Oct. 6, 2011

(30) Foreign Application Priority Data

Mar. 30, 2010 (JP) ................. 2010-078552

(51) Int. Cl.
 *H02K 21/12* (2006.01)
(52) U.S. Cl.
 USPC ............ 310/156.57; 310/156.45; 310/156.53
(58) Field of Classification Search
 CPC ...... H02K 21/14; H02K 1/276; H02K 1/2766
 USPC ............ 310/156.32, 156.38, 156.46, 156.53, 310/156.55, 156.56, 156.57, 156.83
 See application file for complete search history.

(56) References Cited

U.S. PATENT DOCUMENTS 6,031,311 A * 2/2000 Lee .......................... 310/156.57
6,891,298 B2 * 5/2005 Gary ........................ 310/156.53
8,227,952 B2 7/2012 Shichijoh et al.
2004/0041486 A1 3/2004 Gary
2008/0258573 A1 10/2008 Kamiya
2009/0134732 A1 * 5/2009 Shichijoh et al. ........ 310/156.53

FOREIGN PATENT DOCUMENTS

| JP | A-2006-254629 | 9/2006 |
| JP | A-2007-244017 | 9/2007 |
| JP | A-2008-278553 | 11/2008 |
| JP | A-2009-124899 | 6/2009 |
| JP | A-2010-004671 | 1/2010 |
| JP | 2010045919 A * | 2/2010 |

OTHER PUBLICATIONS

Machine Translation, JP 2010045919 A, Feb. 25, 2010.*
Apr. 5, 2011 International Search Report issued in PCT/JP2011/052555 (with translation).
Partial Translation of Notification of Reason(s) for Refusal mailed on Oct. 1, 2013 in Japanese Patent Application No. 2010-078552.

* cited by examiner

Primary Examiner — Tran Nguyen
Assistant Examiner — Thomas Truong
(74) Attorney, Agent, or Firm — Oliff & Berridge, PLC

(57) ABSTRACT

A rotary electric machine configured with a stator, rotor, and permanent magnets disposed in an inverted V-shape that becomes gradually narrower from a side of a center of rotation of the rotor. The rotor is provided with a plurality of support portions that extend radially about the center of rotation, and gap portions are respectively formed in correspondence with the plurality of support portions at positions spaced by a predetermined distance from an edge portion of the permanent magnets in a flowing direction of magnetic flux between the permanent magnets and the stator. The gap portions are formed to have such a length that causes magnetic saturation during generation of low torque in a low-current state and that causes no magnetic saturation during generation of maximum torque in a high-current state in which electricity at a high current is supplied to the stator coil.

1 Claim, 13 Drawing Sheets

MAGNETIC FLUX UNDER NO LOAD

ROTARY ELECTRIC MACHINE WITH IMPROVED ENERGY EFFICIENCY

INCORPORATION BY REFERENCE

The disclosure of Japanese Patent Application No. 2010-078552 filed on Mar. 30, 2010 including the specification, drawings and abstract is incorporated herein by reference in its entirety.

BACKGROUND OF THE INVENTION

The present invention relates to a rotary electric machine, such as an interior permanent magnet synchronous motor, with a structure in which a rotor that supports permanent magnets rotates relative to a stator, and in particular to a rotary electric machine that is capable of reducing loss achieved with a simple configuration.

DESCRIPTION OF THE RELATED ART

There is generally known a rotary electric machine, for example an interior permanent magnet (hereinafter referred to as "IPM") synchronous motor, including a rotary shaft that is rotatable, a stator having a stator core formed in a cylindrical shape, a rotor having a rotor core fixed to the rotary shaft, permanent magnets each provided with a pair of magnetic poles with different magnetic properties arranged in the radial direction of the rotor, a magnetic field yoke provided on the outer periphery of the stator, a winding (stator coil) that can control the density of magnetic flux between the rotor and the stator by forming a magnetic circuit between the magnetic field yoke and the rotor.

In recent years, hybrid vehicles and so forth have been drawing attention as vehicles with improved fuel efficiency. The hybrid vehicles are formed of a gasoline engine, a transmission, an inverter, a battery, a motor, and control devices for such components. The above interior permanent magnet synchronous motor is used in the hybrid vehicles and so forth as a reliable and efficient motor with a variable rotational speed and good controllability.

It is expected to develop a hybrid system that can support large sport utility vehicles (hereinafter referred to as "SUVs"). In order to realize such a hybrid system, however, it is necessary to significantly improve the output density of a motor for driving the vehicle in consideration of the balance with a high-output engine. The output density of a motor may be improved by improving output torque of the motor itself, or by causing the motor to rotate at a high speed and reducing the speed through a gear mechanism to increase torque.

In order to realize a hybrid system that can support the above SUVs, there is proposed an IPM motor that enables high-speed rotation with improved energy efficiency, and that includes first and second magnets disposed within a range of 127° to 140° in terms of electrical angle around the center of rotation of a rotor to form a V-shape pointing to the side of the center of rotation of the rotor, and a rotor body (rotor core) formed with first and second holes that receive the first and second magnets, respectively, the rotor body being configured to include a support portion positioned at the pointing portion of the V-shape to separate the first and second holes (see Japanese Patent Application Publication No. JP-A-2006-254629).

SUMMARY OF THE INVENTION

In a motor, for example an interior permanent magnet (IPM) synchronous motor, however, torque may be decreased in a low-current state. Therefore, it is requested to further reduce a motor loss without decreasing torque in the low-current state or decreasing maximum torque.

The applicant made a diligent study to satisfy such a request, and found that the motor loss of the interior permanent magnet synchronous motor can be further reduced by forming gaps (air gaps) around the permanent magnets embedded in the rotor and properly defining the relationship between the permanent magnets and the gaps. While gaps are formed around the permanent magnets in some interior permanent magnet synchronous motors, there are no interior permanent magnet synchronous motors with any definitions of the relationship between the permanent magnets and the gaps.

Thus, it is an object of the present invention to provide a rotary electric machine with a further reduced motor loss for further enhanced efficiency of the rotary electric machine achieved by properly defining the relationship between permanent magnets and gap portions with as simple a configuration as possible.

According to a first aspect of the present invention, gap portions are respectively formed in correspondence with a plurality of support portions, which are provided in a rotor, at positions spaced by a predetermined distance from an edge portion of permanent magnets in a flowing direction of magnetic flux between the permanent magnets and a stator, and are formed to have such a predetermined length that causes magnetic saturation during generation of low torque in a low-current state in which electricity at a low current is supplied to a stator coil and that causes no magnetic saturation during generation of maximum torque in a high-current state in which electricity at a high current is supplied to the stator coil. Thus, even with a simple configuration in which the gap portions with a predetermined shape are formed in correspondence with the support portions, the operating efficiency of the rotary electric machine can be improved in the low-current state by causing magnetic saturation and weakening magnetic flux of the permanent magnets (reducing magnet magnetic flux), which reduces magnetic flux to be transmitted from the permanent magnets to the stator so as to reduce an iron loss, which makes a decrease in torque unlikely to occur with a low current. In the high-current state, on the other hand, the operating efficiency of the rotary electric machine can be improved by causing no magnetic saturation and reducing a decrease in magnetic flux of the permanent magnets (suppressing a reduction in magnet magnetic flux), which causes no reduction in magnetic flux to be transmitted from the permanent magnets so as to the stator to suppress a reduction in iron loss, which makes a decrease in maximum torque unlikely to occur.

According to a second aspect of the present invention, the gap portions are formed, by notching, at positions respectively corresponding to the permanent magnets in a circumferential direction of the rotor. Thus, the rotary electric machine with high efficiency can be realized just by forming, by notching (punching), the gap portions with a predetermined shape in the rotor by a pressing process or the like.

According to a third aspect of the present invention, the gap portions are formed, by notching, at portions where a radially outer portion of the rotor and the support portions intersect each other at the positions respectively corresponding to the permanent magnets to extend along an inclination direction of the corresponding permanent magnets. Thus, the rotary electric machine with high efficiency can be realized just by forming, by notching (punching), the gap portions with a predetermined shape on the radially inner side of the rotor by a pressing process or the like.

According to a fourth aspect of the present invention, the gap portions are formed at positions respectively corresponding to the permanent magnets in a circumferential direction of the rotor to extend along an inclination direction of the corresponding permanent magnets and to penetrate in a rectangular shape. Thus, the rotary electric machine with high efficiency can be realized just by forming, by notching (punching), the gap portions with a predetermined shape on the radially inner side of the rotor by a pressing process or the like.

According to a fifth aspect of the present invention, if the predetermined distance of the gap portions from the edge portion of the permanent magnets is defined as a distance $l_{core}$ from the permanent magnets to the gap portions, and the predetermined length of the gap portions in a direction perpendicular to the distance $l_{core}$ is defined as an overlap width $l_{mag}$ between the gap portions and the permanent magnets, $l_{mag}/l_{core}$ satisfies the following formula: $2.4 < l_{mag}/l_{core} < 10.0$. Thus, the rotary electric machine with high efficiency can be realized by suitably defining the relationship of the gap portions with the permanent magnets.

BRIEF DESCRIPTION OF THE DRAWINGS

FIGS. 3A, and 3B each illustrate the relationship between a permanent magnet and a gap portion at an outer peripheral edge portion of a rotor, in which FIG. 3A is a plan view showing dimensions defined by the positional relationship between the permanent magnet and the gap portion, and FIG. 3B is a diagram schematically showing the positional relationship of FIG. 3A;

FIGS. 9A to 9C show various relationships in a low-current state, in which FIGS. 9A and 9B are each a graph showing a loss with a low current and FIG. 9C is a graph showing an operating point of magnet magnetic flux with a low current;

FIGS. 10A to 10C show various relationships during generation of maximum torque, in which FIGS. 10A and 10B are each a graph showing torque during generation of maximum torque and FIG. 10C is a graph showing an operating point of magnet magnetic flux with maximum torque;

FIGS. 13A and 13B each illustrate the relationship between a permanent magnet and a gap portion at an outer peripheral edge portion of a rotor according to another embodiment, in which FIG. 13A is a plan view showing dimensions defined by the positional relationship between the permanent magnet and the gap portion, and FIG. 13B is a diagram schematically showing the positional relationship of FIG. 13A.

DETAILED DESCRIPTION OF THE EMBODIMENTS

Embodiments of a rotary electric machine according to the present invention will be described below with reference to FIGS. 1 to 13. While the present invention is applied to a motor generator (rotary electric machine) mounted on a hybrid vehicle in the embodiments described below, it is a matter of course that the rotary electric machine according to the present invention may be applied as a motor and a generator, and may also be applied as a rotary electric machine mounted on various vehicles (electrically powered vehicles such as fuel cell vehicles and electric vehicles) other than hybrid vehicles and various devices such as industrial devices, air-conditioning devices, and environmental devices.

Figure 1:
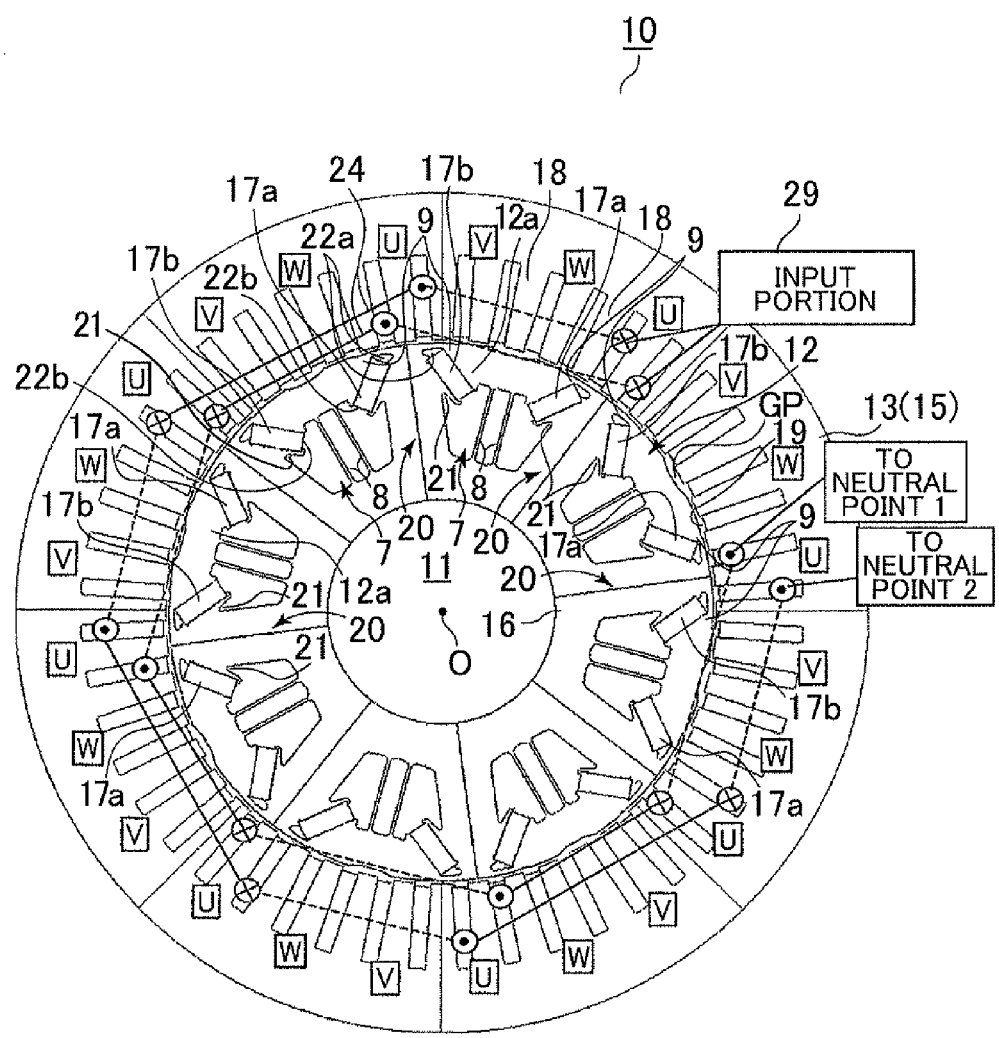
FIG. 1 is a cross-sectional plan view showing the entirety of a rotary electric machine according to an embodiment of the present invention.
Figure 2:
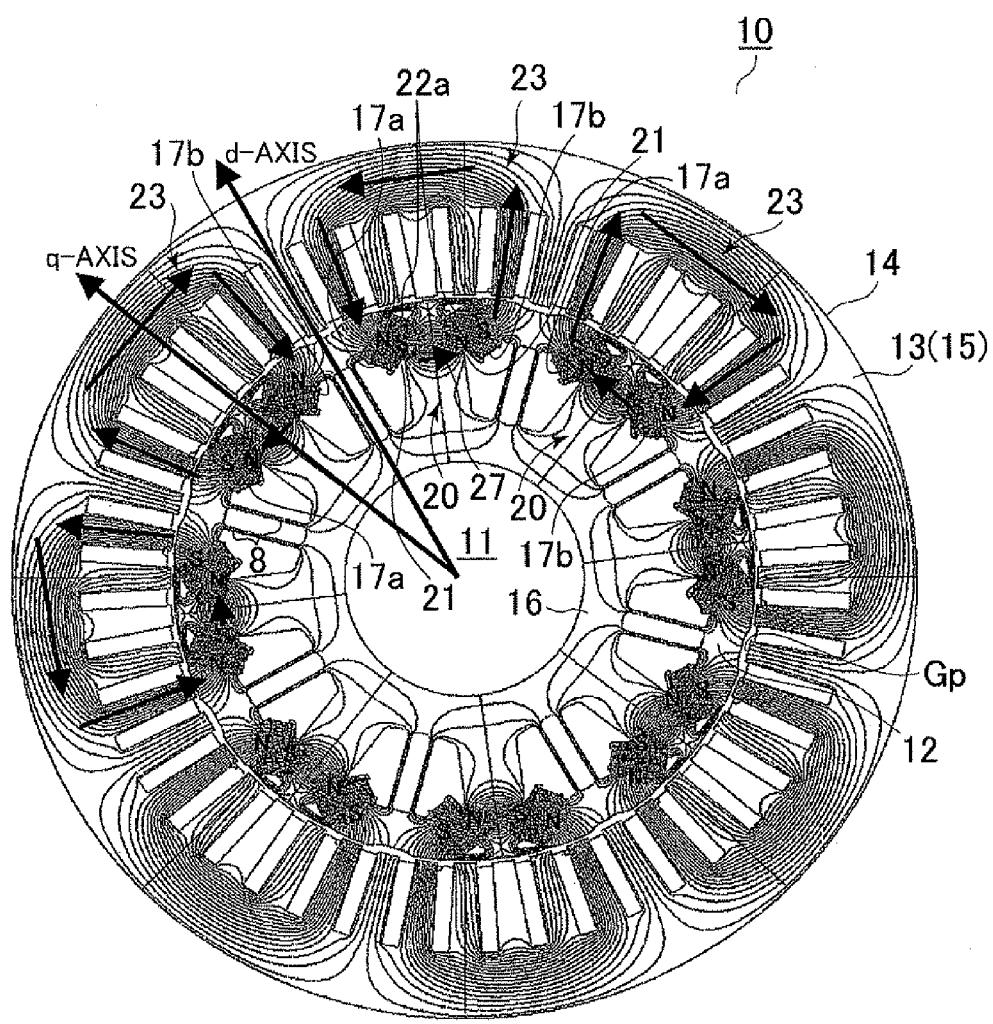
FIG. 2 is a cross-sectional plan view showing magnetic flux with the rotary electric machine according to the embodiment of the present invention under no load.

First, the schematic configuration of a rotary electric machine according to an embodiment will be described with reference to FIGS. 1 and 2. FIG. 1 is a cross-sectional plan view showing the entirety of the rotary electric machine according to the embodiment. FIG. 2 is a cross-sectional plan view showing magnetic flux with the rotary electric machine under no load. In FIG. 1, a field yoke 14 is not shown for convenience.

As shown in FIGS. 1 and 2, a rotary electric machine 10 includes a rotor 12 in which a plurality of permanent magnets 17a, 17b are disposed in the circumferential direction, and a stator 13 in which coils for three phases (stator coils 24 in FIG. 1) that form a rotating magnetic field are wound.

That is, the rotary electric machine 10 as a whole is formed in a cylindrical shape elongated in the direction perpendicular to the sheet surface of FIG. 1, and includes a rotary shaft 11 at the center portion as viewed in plan. The rotary electric machine 10 also includes: the stator 13 including a stator core 15 formed in an annular shape and the stator coils 24 wound around the stator core 15; the rotary shaft 11 that is positioned at the center of the stator 13 and is rotatably supported; the field yoke 14 formed in a hollow cylindrical shape and disposed on an outer periphery of the stator 13; the rotor 12 that includes a rotor core 16 fixed to the rotary shaft 11 and is rotatably disposed in the stator 13; and a plurality of (in the embodiment, eight) sets of magnet pairs 9, each of which includes the permanent magnets 17a, 17b disposed in an inverted V-shape that becomes gradually narrower from the side of the center of rotation O of the rotor 12.

The permanent magnets 17a, 17b are embedded in the rotor core 16 to extend in the direction perpendicular to the sheet surface of FIG. 1. The rotor core 16 forming the rotor 12 is formed by stacking a plurality of magnetic steel sheets in the axial direction of the rotary shaft 11 (direction perpendicular to the sheet surface of FIG. 1). The stator 13 includes the stator coils 24 wound around the stator core 15. On an inner peripheral surface of the stator core 15, a plurality of stator teeth 18 are formed at intervals in the circumferential direction, and slots 19 are formed between the stator teeth 18.

The stator coils 24 are wound over the entire periphery of the stator core 15 in accordance with predetermined winding rules to form windings for three phases (U phase, V phase, and W phase) connected in a predetermined manner. That is, the stator coils 24 are wound such that windings in the same phase of an alternating current with a plurality of phases and with opposite polarities are disposed adjacent to each other so that U+ phase and U− phase form a pair, V+ phase and V− phase form a pair, and W+ phase and W− phase form a pair. While only the stator coil 24 for U phase is schematically shown in FIG. 1 for convenience, the stator coils 24 for V phase and W phase are provided in the same way.

An air gap Gp with a predetermined clearance is provided between the rotor 12 and the stator 13 so that the rotor 12 and the stator 13 are slightly spaced from each other in the radial direction. The stator 13 is formed in a hollow cylindrical shape, and formed by the stator core 15 formed by stacking a plurality of magnetic steel sheets in the direction perpendicular to the sheet surface of FIG. 1. In the stator 13, the rotor 12 is rotatably supported around the columnar rotary shaft 11 about the center of rotation (rotational axis) O extending in the direction perpendicular to the sheet surface of FIG. 1.

The field yoke 14 housing the stator 13 and the rotor 12 includes a side wall portion (not shown) attached to the outer circumferential surface of the stator 13, and a top plate portion (not shown) formed at each end of the side wall portion in the axial direction. A through hole (not shown) is formed at the center of the top plate portion. The rotary shaft 11 is rotatably fitted and supported in the through hole via a bearing (not shown).

In the rotor core 16, the plurality of (in the embodiment, 16) permanent magnets 17a, 17b (which may be hereinafter collectively referred to simply as "permanent magnets 17") are disposed alternately at predetermined intervals in the circumferential direction of the rotor 12. The plurality of permanent magnets 17 are disposed such that adjacent permanent magnets 17a, 17b form an inverted V-shape that becomes gradually narrower from the center of rotation O side to the outer peripheral side. The rotor core 16 of the rotor 12 is formed with a plurality of (in the embodiment, eight) support portions 20 that extend radially at equal angular intervals with the center of rotation O of the rotary shaft 11 at the center of the support portions 20. The permanent magnets 17a, 17b forming the magnet pairs 9 are embedded in the rotor core 16 at predetermined positions.

For example, the permanent magnets 17a, 17b of the magnet pair 9 illustrated in the uppermost portion of FIG. 2 are disposed such that a surface of the permanent magnet 17a facing the rotor outer peripheral side and a surface of the permanent magnet 17a facing the rotor inner peripheral side are the N pole and the S pole, respectively, and a surface of the permanent magnet 17b facing the rotor outer peripheral side and a surface of the permanent magnet 17b facing the rotor inner peripheral side are the S pole and the N pole, respectively. The directions of the S pole and the N pole of the permanent magnets 17a, 17b in the magnet pairs 9 are opposite between adjacent magnet pairs 9. As shown in FIG. 2, the magnetic poles of the permanent magnets 17 form a d-axis and a q-axis indicated by the arrows in the drawing.

A space portion 7 is formed in the rotor 12 (rotor core 16) on the center of rotation O side of adjacent permanent magnets 17b and 17a to penetrate in the axial direction of the rotary shaft 11. Two beam-like portions 8 are provided to extend across the space portion 7 in the radial direction. The rotor 12 is formed with gap portions (air gaps) 21 corresponding to the permanent magnets 17a (17b). The plurality of (in the embodiment, 16) gap portions 21 are respectively formed in the support portions 20 at positions corresponding to the permanent magnets 17a, 17b in the circumferential direction of the rotor 12.

As shown in FIG. 2, the plurality of gap portions 21 in the plurality of support portions 20 are formed to block (in the direction of blocking) a flowing direction 27 of magnetic flux 23. This also applies to gap portions 25, 26, 28, 30 to be discussed later. The gap portions 21 are respectively provided in correspondence with the plurality of support portions 20 as shown in FIG. 1, and formed at positions spaced by a predetermined distance ($l_{core}$) from an edge portion 17c (see FIGS. 3A and 3B) of the permanent magnets 17a, 17b in the flowing direction (arrows 27 of FIGS. 2 and 3A) of the magnetic flux 23 between the magnet pairs 9 formed by the permanent magnets 17a, 17b and the stator 13, and shaped to have such a predetermined length ($l_{mag}$) that causes magnetic saturation in a low-current state in which electricity supplied to the stator coils 24 is larger than a first predetermined value (a motor current (phase current) of 9.0 [Arms] shown in FIG. 5) and that causes no magnetic saturation during generation of maximum torque in a high-current state in which electricity supplied to the stator coils 24 is smaller than a second predetermined value (a motor current of 150.0 [Arms] shown in FIG. 5) that is larger than the first predetermined value.

Figure 3A:
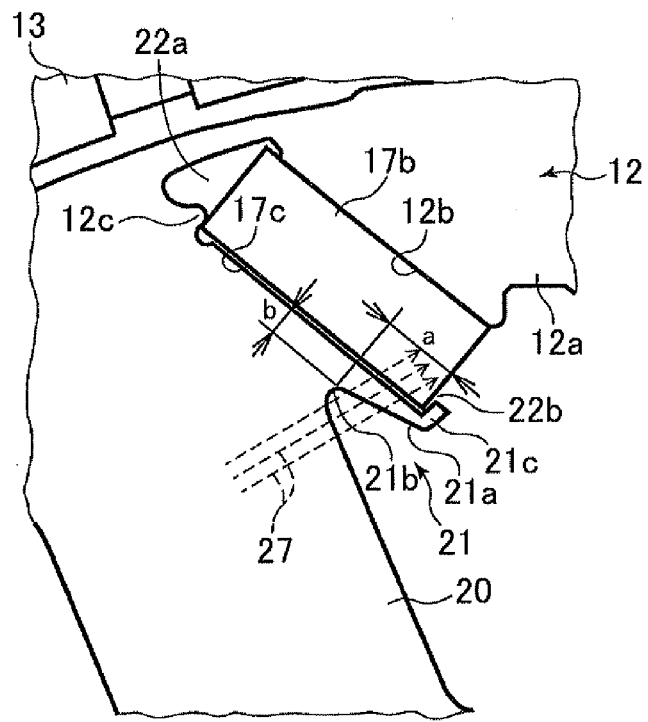
Figure 3B:
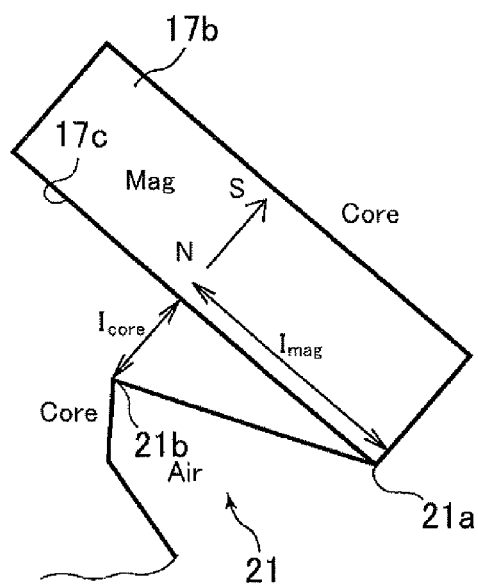

As shown in FIGS. 3A and 3B, the gap portions 21 are formed, by notching, at portions where an radially outer portion 12a of the rotor 12 and the support portions 20 intersect each other at the positions respectively corresponding to the permanent magnets 17a, 17b in the circumferential direction of the rotor 12 to extend along the inclination direction of the corresponding permanent magnets 17a, 171). In FIG. 3A, reference numeral 21a denotes a formation start portion of the gap portion 21, and reference numeral 21b denotes a formation end portion of the gap portion 21. The gap portion 21 is formed in a generally V-shape to extend from the space portion 7 side so as to wedge into the radially outer portion 12a side, and formed obliquely to extend gradually away from the edge portion 17c of the permanent magnet 17a, 17b from the formation start portion 21a toward the formation end portion 21b so that the gap portion 21 is farthest from the edge portion 17c at the formation end portion 21b, whereby a distance $l_{core}$ from the permanent magnet 17a to the gap portion 21 is defined.

The permanent magnet 17a, 17b is fixed by being embedded in a fitting portion 12b formed, by notching, in the radially outer portion 12a of the rotor 12 to extend in the axial direction of the rotary shaft 11. A space portion 22a is formed on the stator 13 side of the fitting portion 12b to extend in the axial direction of the rotary shaft 11. A space portion 22b is formed on the center of rotation O side of the fitting portion 12b to extend in the axial direction of the rotary shaft 11. An engagement projection portion 12c that blocks movement of the permanent magnet 17a, 17b to the space portion 22a side is formed on the support portion 20 side of the space portion 22a. An engagement projection portion 21c that blocks movement of the permanent magnet 17a, 17b to the center of rotation O side is formed on the center of rotation O side of the space portion 22b.

A clearance is provided between the edge portion 17c and the rotor 12 in the illustration of FIG. 3A. In practice, however, no clearance is provided, and the edge portion 17c is in tight contact with the rotor 12. While FIGS. 3A and 313 each illustrate the permanent magnet 17b and its surrounding elements, the gap portion 21 corresponding to the permanent magnet 17a is formed in the opposite direction (with the opposite inclination) with respect to the gap portion 21 corresponding to the permanent magnet 17b.

In the rotary electric machine 10 configured as described above, when a control section (not shown) that controls the rotary electric machine receives from an ECU (Electronic Control Unit) (not shown) or the like a torque command value specifying torque to be output, a motor control current for outputting torque specified by the received torque command value is generated and supplied to flow from input portions 29 shown in FIG. 1 through the stator coils 24 to neutral points 1 and 2 (shown only for U phase for convenience) to rotate the rotor 12 relative to the stator 13.

Next, the configuration with the gap portions 21 provided in the rotor 12 and operation effected by the configuration will be described. In the rotary electric machine 10 with the structure shown in FIGS. 3A and 313 in which the gap portions 21 overlap the permanent magnets 17, defining a predetermined distance (b) of the gap portions 21 from the edge portion 17c of the permanent magnets 17a, 17b as the distance $l_{core}$ from the edge portion 17c of the permanent magnets 17a, 17b to the formation end portion 21b of the gap portions 21, and defining a predetermined length of the gap portions 21 in the direction perpendicular to the distance $l_{core}$ of the gap portions 21 as a distance a between the formation start portion 21a and the formation end portion 21b of the gap portions 21, that is, an overlap width $l_{mag}$ between the gap portions 21 and the permanent magnets 17a, 17b, $l_{mag}/l_{core}$ satisfies the following formula (A):

$$2.4 < l_{mag}/l_{core} < 10.0 \tag{A}$$

In the rotary electric machine 10, in the case where formula (A) is satisfied, a decrease in torque can be made unlikely to occur in the low-current state, and maximum torque can be generated sufficiently when maximum torque is to be generated in the high-current state, as discussed later. In FIGS. 3A and 313, the dimension a of $l_{mag}$ may be set to 3.20 mm, for example, and the dimension b of $l_{core}$ may be set to 1.33 mm, for example.

Now, the mechanism (1) of the present invention will be described. In general, torque T and a loss W are represented by the following formulas (B) and (C) using magnet magnetic flux Φm:

$$T = P_n \times \{\Phi m + (L_d - L_q) \times I_d\} I_q \tag{B}$$

$$W = k_h \times f \times B^2 + k_e \times f^2 \times B^2 \quad \text{Steinmetz equation}$$

$$\Phi = B \times S$$

$$W \propto k_h \times f \times \Phi m^2 + k_e \times f^2 \times \Phi m^2 \tag{C}$$

where $P_n$ represents the number of poles, $L_d$ represents the d-axis inductance, $L_q$ represents the q-axis inductance, $I_d$ represents the d-axis current, $I_q$ represents the q-axis current, $k_h$ represents a hysteresis loss proportionality constant (coefficient), f represents the frequency, B represents magnetic flux density, Φ represents magnetic flux [Wb], S represents the cross-sectional area, and $k_e$ represents an eddy-current loss proportionality constant (coefficient).

Figure 5:
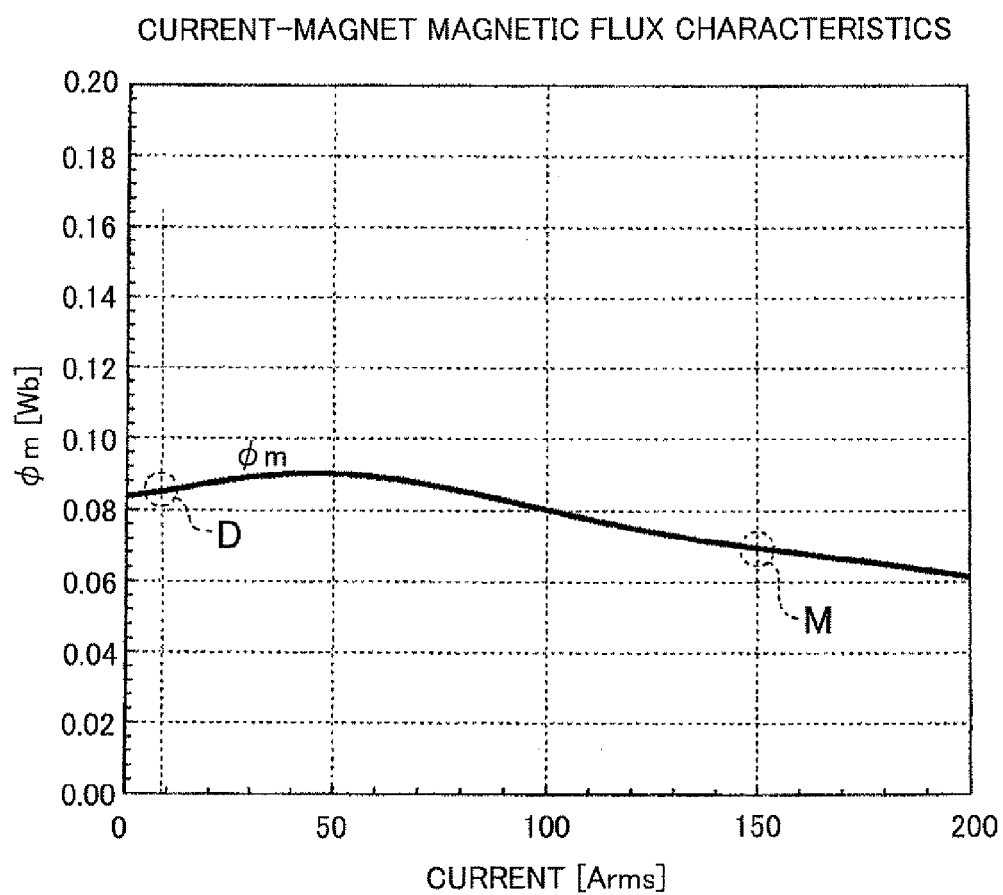
FIG. 5 is a graph showing the current-magnet magnetic flux characteristics of the rotary electric machine according to the embodiment.

With the rotor 12 having the gap portions 21 according to the embodiment, the relationship between the motor current and magnet magnetic flux Φm is as shown in FIG. 5. FIG. 5 is a graph showing the current-magnet magnetic flux characteristics of the rotary electric machine 10 according to the embodiment, in which the vertical axis represents magnet magnetic flux Φm [Wb], and the horizontal axis represents the motor current [Arms].

That is, in the graph shown in FIG. 5, magnet magnetic flux Φm varies gently in a range from 0.084 [Wb] to 0.06 [Wb] with the motor current in a range of 0 to 200 [Arms].

Figure 9A:
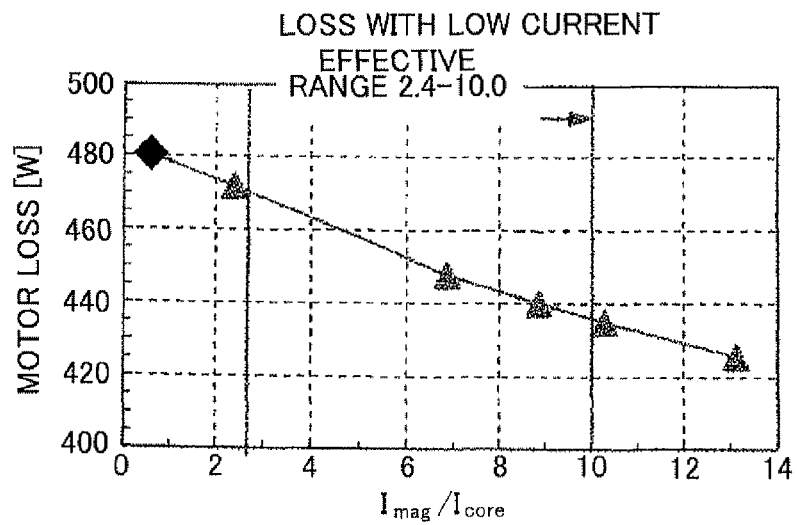
Figure 9B:
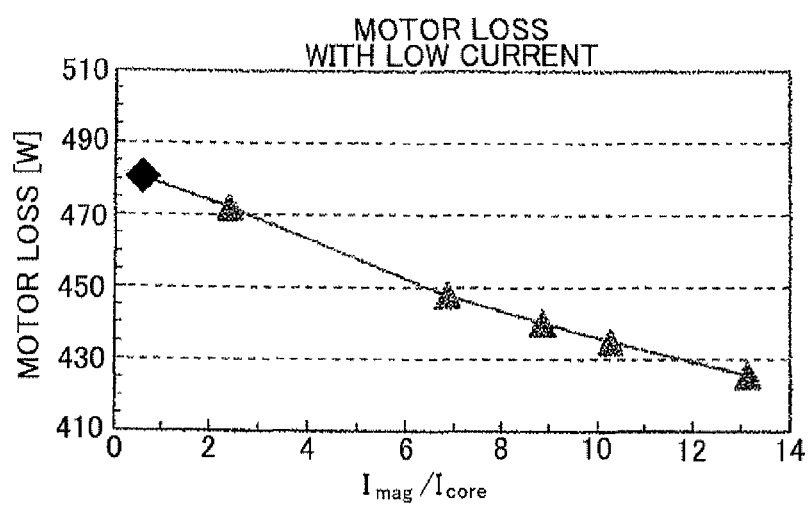
Figure 9C:
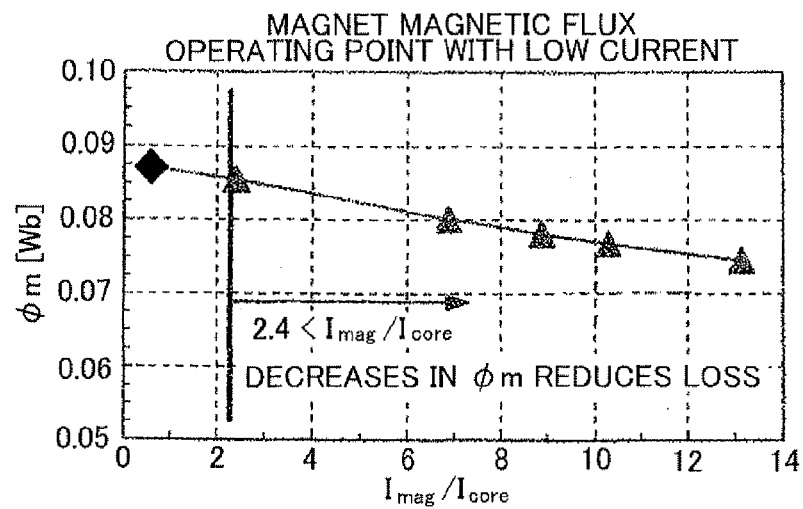
Figure 10A:
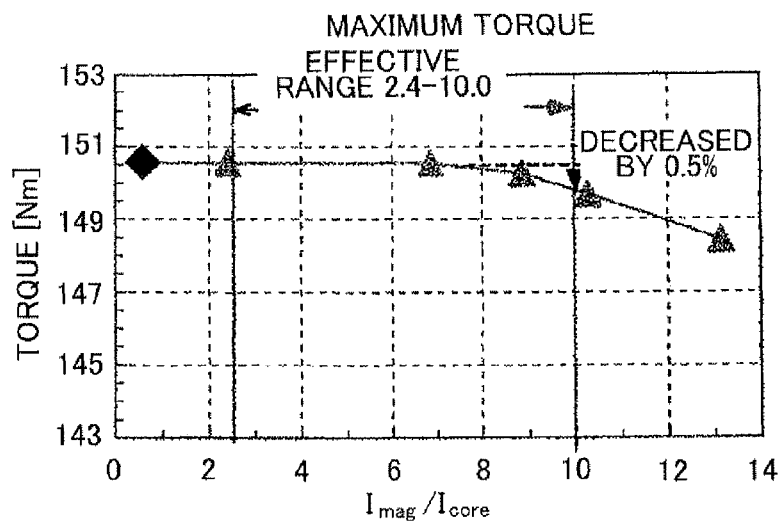
Figure 10B:
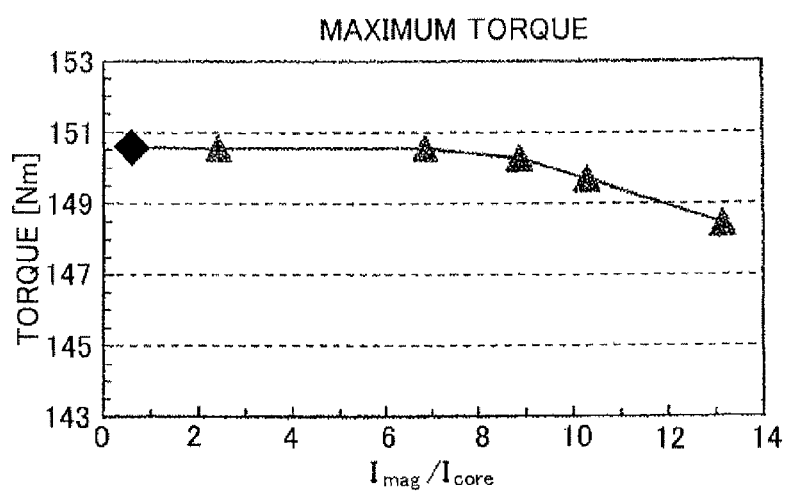
Figure 10C:
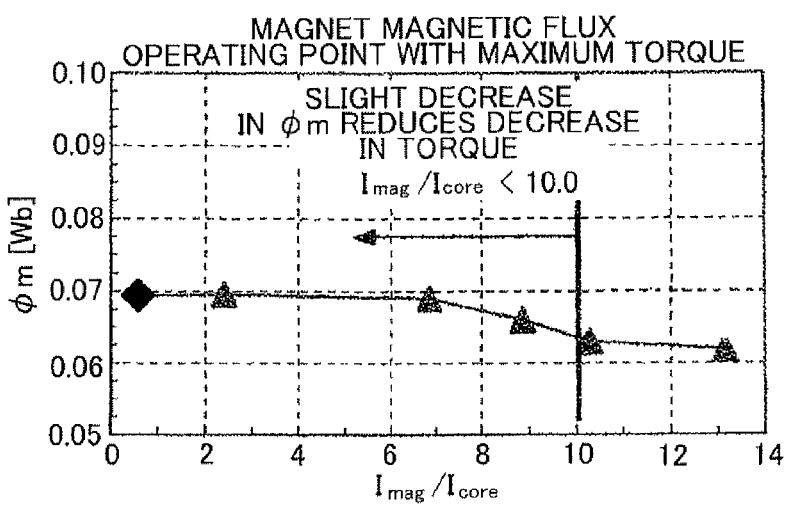

With such graph characteristics, the relationship of magnet magnetic flux Φm with respect to $l_{mag}/l_{core}$, which is the ratio of the overlap width $l_{mag}$ to the distance $l_{core}$ in the rotary electric machine 10 with the rotor 12 having the gap portions 21, at an operating point D in a low-current state in which the motor current (phase current) is 9.0 [Arms], for example, is as shown in FIGS. 9A, 9B, and 9C. Meanwhile, the relationship of magnet magnetic flux Φm with $l_{mag}/l_{core}$, which is the ratio of the overlap width $l_{mag}$ to the distance $l_{core}$, at an operating point M in a high-current state in which the motor current (phase current) is 150.0 [Arms], for example, is as shown in FIGS. 10A, 10B, and 10C. The term "operating point" means a point indicating the state, such as the magnetic flux density B and the magnetic field strength H [A/m], of the permanent magnets 17 in the magnetic circuit.

In the low-current state, as seen from FIG. 9C, the point of $l_{mag}/l_{core} = 2.4$ defines a boundary, and in the case where $$2.4 < l_{mag}/l_{core}$$

is satisfied, magnet magnetic flux Φm starts reducing from 0.085 [Wb]. Therefore, as indicated by the above formula (C), $$W \propto k_h \times f \times \Phi m^2 \times k_e \times f^2 \times \Phi m^2 \tag{C}$$

the loss W (that is, the motor loss [W]) starts gradually decreasing from about 470 [W], as shown in FIGS. 9A and 9B, to cause magnetic saturation. That is, the operating efficiency of the rotary electric machine 10 can be improved by weakening (reducing) magnet magnetic flux Φm of the permanent magnets 17, which reduces magnetic flux to be transmitted from the permanent magnets 17 to the stator 13 so as to reduce the iron loss, which makes a decrease in torque unlikely to occur in the low-current state.

In the high-current state, as seen from FIG. 10C, when a range of $l_{mag}/l_{core} < 10.0$ is considered, magnet magnetic flux Φm decreases slightly and torque decreases slightly if $l_{mag}/l_{core}$ is from 0 to 6.9. Even after $l_{mag}/l_{core}$ exceeds 6.9, the effect of the present invention can still be obtained before $l_{mag}/l_{core}$ reaches 10.0, although torque [Nm] during rotation of the rotor 12 decreases by 0.5% (see FIG. 9A).

That is, during generation of maximum torque in the high-current state, as seen from FIG. 10C, in the case where $$l_{mag}/l_{core} < 10.0$$

is satisfied, magnet magnetic flux Φm is larger than that in the case where $$l_{mag}/l_{core} \geq 10.0$$

is satisfied. Thus, as indicated by the above formula (B), $$T = P_n \times \{\Phi m + (L_d - L_q) \times I_d\} \times I_q \tag{B}$$

a decrease in maximum torque T is smaller.

When the range in which torque [Nm] during rotation of the rotor 12 is decreased by 0.5% is defined as an effective range in which the effect of the present invention is obtained, the numerical range of $2.4 < l_{mag}/l_{core} < 10.0$ shown in FIG. 10A is defined as the effective range. The numerical range of $l_{mag}/l_{core}$ indicated by the above formula (A) is more preferably reduced to $2.4 < l_{mag}/l_{core} < 6.9$. In this case, a decrease in torque [Nm] during rotation of the rotor 12 can be suppressed more effectively, which reduces the motor loss during generation of maximum torque to further improve the rotating efficiency.

Next, the mechanism (2) of the present invention will be described. First, magnet magnetic flux Φm is considered. In the case of a magnetic circuit equivalent to the configuration of the embodiment shown in FIG. 4, magnet magnetic flux Φm can be represented by the following formula (D) using a permeance method.

Figure 4:
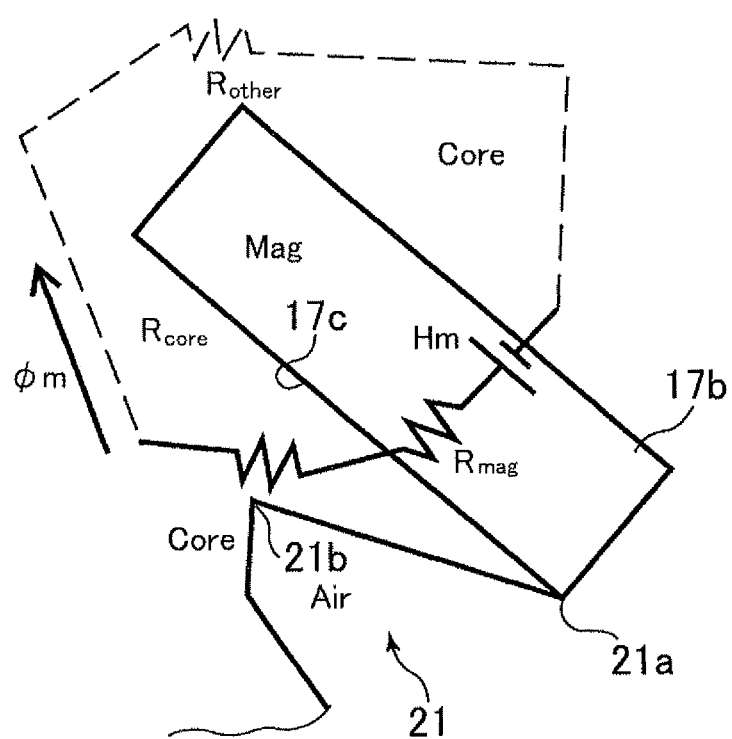
FIG. 4 is a diagram schematically showing a magnetic circuit formed in the state of FIG. 3B.

That is, as shown in FIG. 4, the magnetic circuit formed in the rotor 12 (rotor core 16) by the permanent magnet 17a (or 17b) is formed of a magnet magnetic field $H_m$, a magnetic resistance $R_{mag}$ [A/Wb] of an $l_{mag}$ portion, a magnetic resistance $R_{core}$ of an $l_{core}$ portion, and a magnetic resistance $R_{other}$ of a portion other than the $l_{mag}$ portion and the $l_{core}$ portion, and magnet magnetic flux Φm is as indicated by the arrow. The relationship between these components is represented as follows:

$$\Phi m = H_m / (R_{mag} + R_{core} + R_{other})$$

$$R_{core} = (1/\mu_{core}) \times (l_{core}/S_{core})$$

$$R_{mag} = (1/\mu_r) \times (l_{mag}/S_{mag})$$

$$B_{mag} = \mu_r \times \mu_0 \times H_{mag}$$

$$\Phi m = H_m / \{(\mu_0 \times H_{mag}/B_{mag}) \times (l_{mag}/S_{mag}) + (1/\mu_{core}) \times (l_{core}/S_{core}) + R_{other}\} \quad (D)$$

where $S_{core}$ represents the cross-sectional area of the $l_{core}$ portion, $S_{mag}$ represents the cross-sectional area of the $l_{mag}$ portion, $B_{mag}$ represents the magnetic flux density of the $l_{mag}$ portion, $H_{mag}$ represents the magnetic field of the $l_{mag}$ portion, $\mu_{core}$ represents the magnetic permeability [H/m] of the $l_{core}$ portion, $\mu_r$ represents the magnetic permeability (recoil permeability=an indication of how easily a permanent magnet in a magnetic circuit is magnetized relative to a magnetic field to which the permanent magnet is subjected) of the $l_{mag}$ portion, and $\mu_0$ represents the magnetic permeability of a vacuum. $R_{other}$ and $H_m$ are constant for a given operating point.

Now, $B_{mag}$ in the above formula (D) is considered. That is, as seen from the magnet material characteristics shown in FIG. 8A, $B_{mag}$, which is the magnetic flux density of the $l_{mag}$ portion shown in FIG. 3B, is high (about 1.04 [T]) with a low current, and low (about 0.46 [T]) during generation of maximum torque.

Figure 8A:
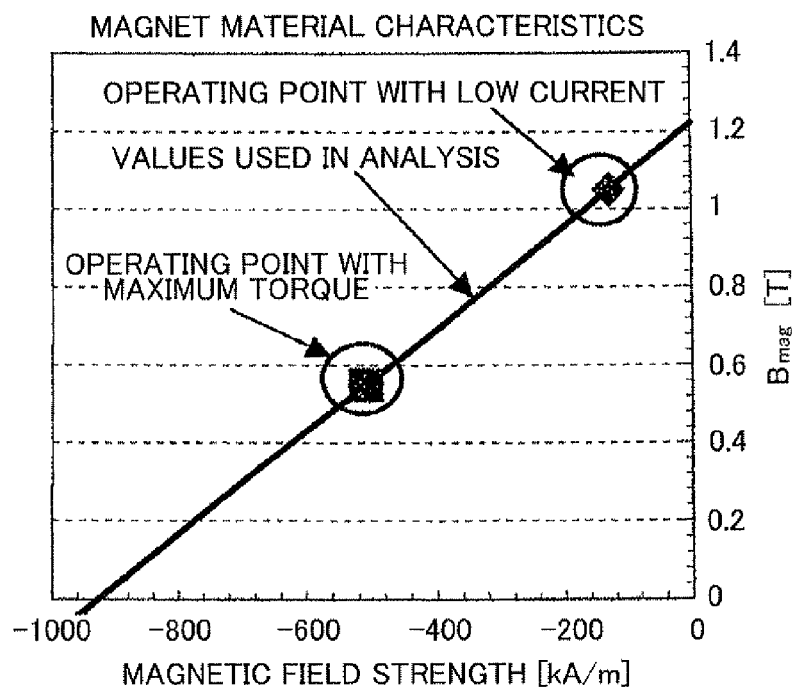
FIG. 8A is a graph showing an operating point with a low current, an operating point with maximum torque, and so forth.
Figure 8B:
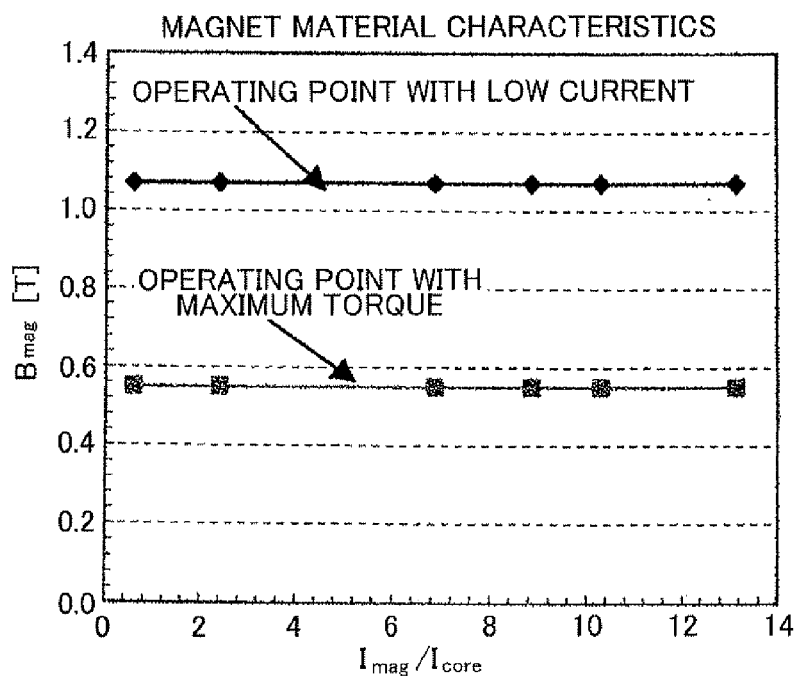
FIG. 8B is a graph showing the magnet material characteristics at the operating point with a low current and the operating point with maximum torque.

The relationship between $l_{mag}/l_{core}$ and $B_{mag}$ at an operating point with a low current and an operating point with maximum torque is as shown in FIG. 8B. That is, as shown in FIG. 8B, the value of $B_{mag}$, which is the magnetic flux density of the $l_{mag}$ portion, is determined by the operating point irrespective of the value of $l_{mag}/l_{core}$. Thus, $B_{mag}$ is constant at about 1.04 [T] and about 0.56 [T] at the operating point with a low current and the operating point with maximum torque, respectively. Thus, $B_{mag}$ takes a constant value for a given operating point.

Figure 6A:
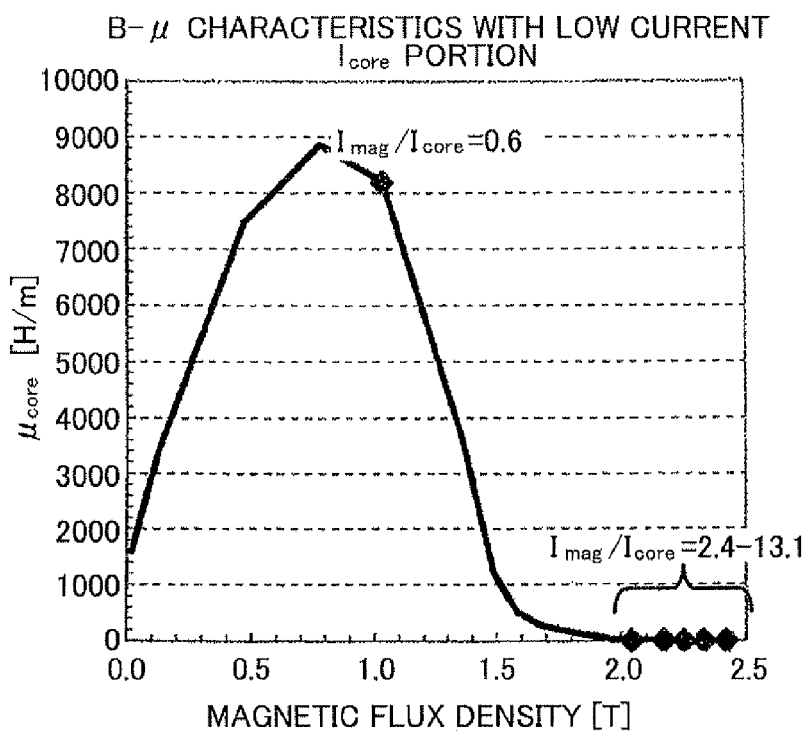
FIG. 6A is a graph showing the B-μ characteristics at an $l_{core}$ portion in a low-current state according to the embodiment.
Figure 6B:
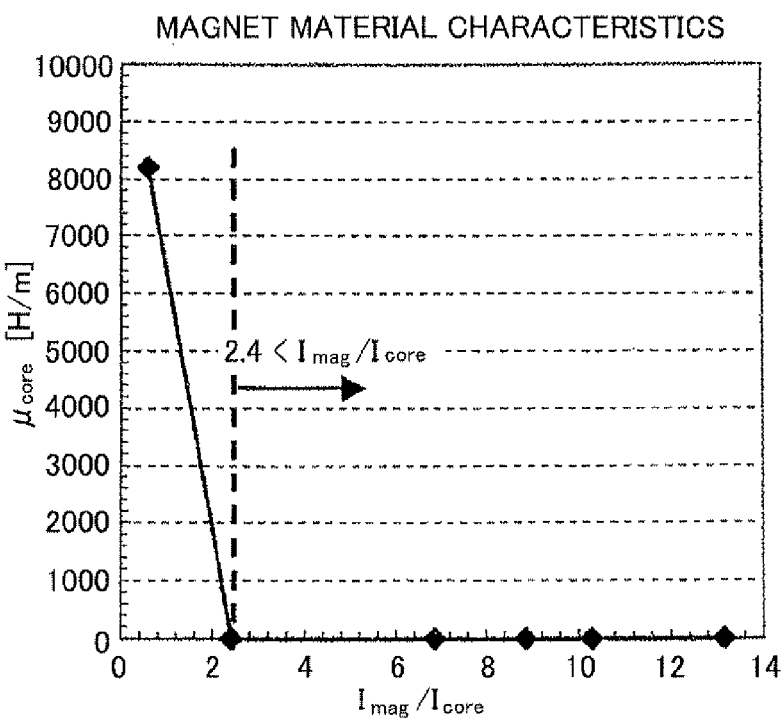
FIG. 6B is a graph showing the magnet material characteristics in the low-current state.
Figure 7A:
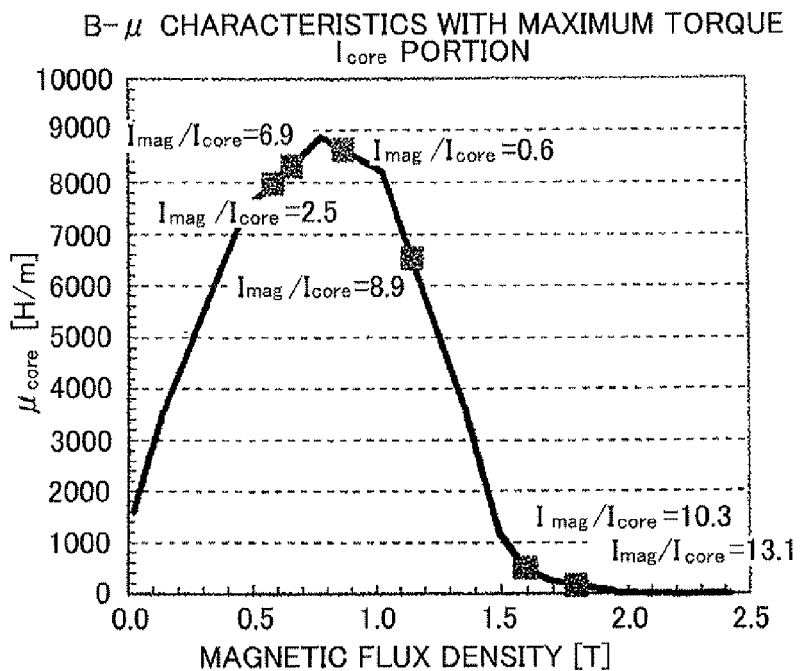
FIG. 7A is a graph showing the B-μ characteristics at the $l_{core}$ portion during generation of maximum torque according to the embodiment.
Figure 7B:
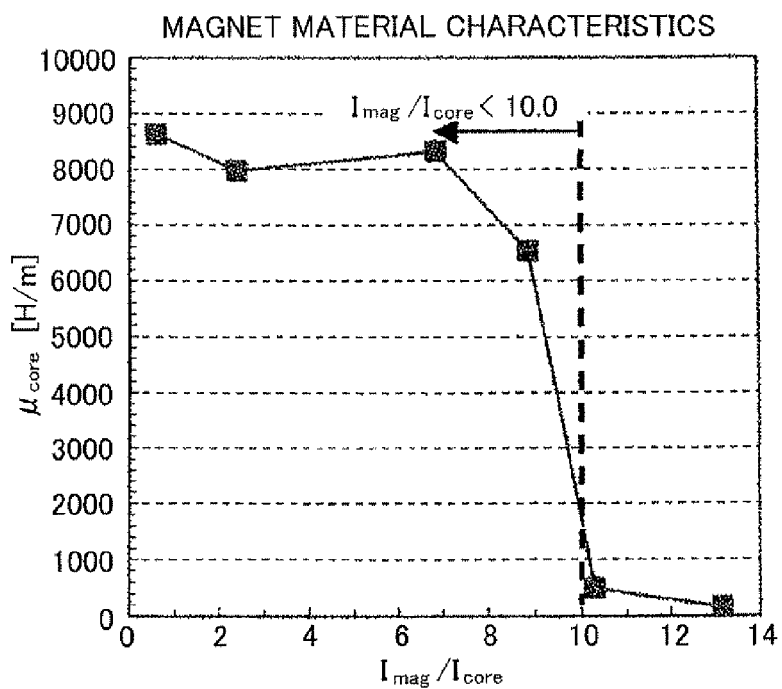
FIG. 7B is a graph showing the magnet material characteristics during generation of maximum torque.

Next, the mechanism (3) of the present invention will be described. First, $\mu_{core}$, which is the magnetic permeability of the $l_{core}$ portion, with a low current (in a low-current state) and with maximum torque (in a maximum-torque state) is considered. FIGS. 6A and 7A are graphs showing the correlation between the magnetic flux density [T] and the magnetic permeability [H/m] of the $l_{core}$ portion with a low current and with maximum torque, respectively. FIGS. 6B and 7B are graphs showing the magnetic permeability [H/m] of the $l_{core}$ portion with respect to $l_{mag}/l_{core}$ in the low-current state and in the maximum-torque state, respectively.

That is, in the low-current state, as seen from FIG. 6B, when $2.4 < l_{mag}/l_{core}$ is satisfied, $\mu_{core}$, which is the magnetic permeability of the $l_{core}$ portion, takes a small value (substantially 0 [H/m]). Therefore, as indicated by the above formula (D), $$\Phi m = H_m / \{(\mu_0 \times H_{mag}/B_{mag}) \times (l_{mag}/S_{mag}) + (1/\mu_{core}) \times (l_{core}/S_{core}) + R_{other}\} \quad (D)$$

magnet magnetic flux Φm takes a small value, and as indicated by the above formula (C), $$W \propto k_h \times f \times \Phi m^2 + k_e \times f^2 \times \Phi m^2$$

the loss W is reduced. The magnetic permeability has an inclination with hysteresis characteristics. Thus, when magnetic saturation is caused, the magnetic permeability becomes small to be close to an air-core state, and in consideration that the self-inductance, which is not reduced to as low as zero, becomes smallest in a short-circuited state, the current increases.

With maximum torque, on the other hand, as seen from FIG. 7B, when $l_{mag}/l_{core} < 10.0$ is satisfied, $\mu_{core}$, which is the magnetic permeability of the $l_{core}$ portion, takes a large value (for example, 8400 [H/m] when $l_{mag}/l_{core}$ is 6.5). Therefore, as indicated by the above formula (D), $$\Phi m = H_m / \{(\mu_0 \times H_{mag}/B_{mag}) \times (l_{mag}/S_{mag}) + (1/\mu_{core}) \times (l_{core}/S_{core}) + R_{other}\}$$

magnet magnetic flux Φm takes a large value, and as indicated by the above formula (B), $$T = P_n \times \{\Phi m + (L_d - L_q) \times I_d\} \times I_q$$

a decrease in torque T is reduced.

As has been described above, in the rotary electric machine 10 according to the embodiment, the rotor 12 is provided with the plurality of support portions 20 which extend radially about the center of rotation O, and the gap portions 21 are respectively formed in correspondence with the plurality of support portions 20 at positions spaced by a predetermined distance ($l_{core}$) from the edge portion 17c of the permanent magnets 17a, 17b in the flowing direction (arrows 27 of FIG. 2) of the magnetic flux 23 between the permanent magnets 17a, 17b and the stator 13, and are formed to have such a predetermined length ($l_{mag}$) that causes magnetic saturation in a low-current state in which electricity supplied to the stator coils 24 is larger than a first predetermined value (a motor current of 9.0 [Arms] shown in FIG. 5) and that causes no magnetic saturation during generation of maximum torque in a high-current state in which electricity supplied to the stator coils 24 is smaller than a second predetermined value (a motor current of 150.0 [Arms] shown in FIG. 5) that is larger than the first predetermined value.

Thus, according to the embodiment, even with a simple configuration in which the gap portions 21 with a predetermined shape are formed in correspondence with the support portions 20, magnetic flux of the permanent magnets 17a, 17b is weakened (magnet magnetic flux is reduced) to cause magnetic saturation when the supplied current is larger than the first predetermined value (that is, with low torque and a low supplied current (in a low-current state)). Thus, magnetic flux to be transmitted from the permanent magnets 17a, 17b to the stator 13 can be reduced so as to reduce the iron loss, which is represented by the sum of a hysteresis loss and an eddy-current loss. Consequently, the operating efficiency (motor performance) of the rotary electric machine 10 can be improved by making a decrease in torque unlikely to occur in the low-current state.

When the supplied current is smaller than the second predetermined value (that is, during generation of maximum torque with a high supplied current (with a high current)), on the other hand, the operating efficiency (motor performance) of the rotary electric machine 10 can be improved by reducing a decrease in magnetic flux of the permanent magnets 17a, 17b (suppressing a reduction in magnet magnetic flux) and causing no magnetic saturation, which causes no reduction in magnetic flux to be transmitted from the permanent magnets 17a, 17b to the stator 13 and suppresses a reduction in iron loss, which makes a decrease in maximum torque unlikely to occur.

According to the embodiment, in addition, the gap portions 21 are formed, by notching, at positions respectively corresponding to the permanent magnets 17a, 17b in the circumferential direction of the rotor 12. Thus, the rotary electric machine 10 with high efficiency can be realized just by forming, by notching (punching), the gap portions 21 with a predetermined shape by a pressing process or the like.

According to the embodiment, further, the gap portions 21 are formed, by notching, at portions where the radially outer portion 12a of the rotor 12 and the support portions 20 intersect each other at the positions respectively corresponding to the permanent magnets 17a, 17b in the circumferential direction of the rotor 12 to extend along the inclination direction of the corresponding permanent magnets 17a, 17b. Thus, the rotary electric machine 10 with high efficiency can be realized just by forming, by notching (punching), the gap portions 21 with a predetermined shape on the radially inner side of the rotor 12 by a pressing process or the like.

According to the embodiment, furthermore, defining the predetermined distance of the gap portions 21 from the edge portion 17c of the permanent magnets 17a, 17b as a distance $l_{core}$ from the permanent magnets 17a, 17b to the gap portions 21, and defining the predetermined length of the gap portions 21 in the direction perpendicular to the distance $l_{core}$ as an overlap width $l_{mag}$ between the gap portions 21 and the permanent magnets 17a, 17b, $l_{mag}/l_{core}$ satisfies the following formula: $2.4 < l_{mag}/l_{core} < 10.0$. Thus, the rotary electric machine 10 with high efficiency can be realized by optimizing the relationship of the gap portions 21 with the permanent magnets 17a, 17b.

Figure 11A:
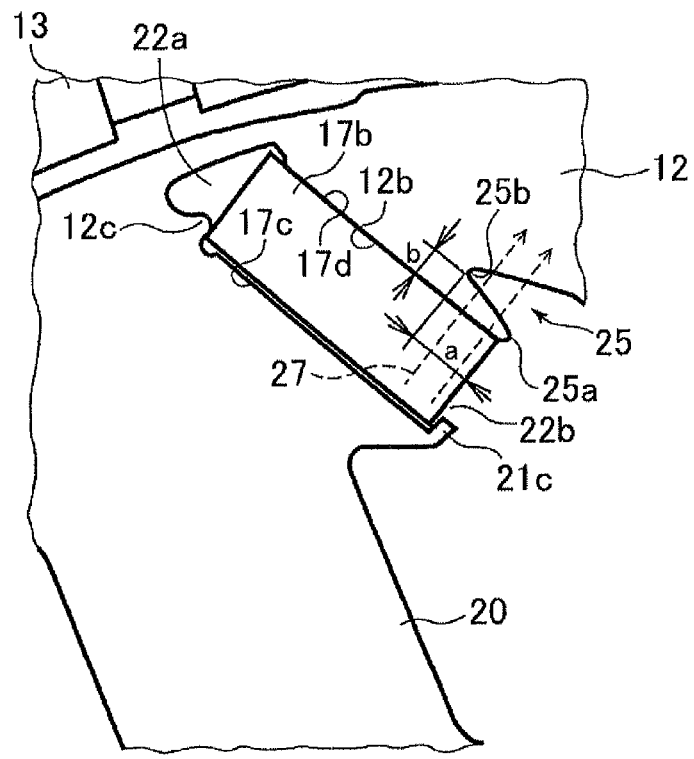
FIGS. 11A and 11B each illustrate the relationship between a permanent magnet and a gap portion at an outer peripheral edge portion of a rotor according to a modification.
Figure 11B:
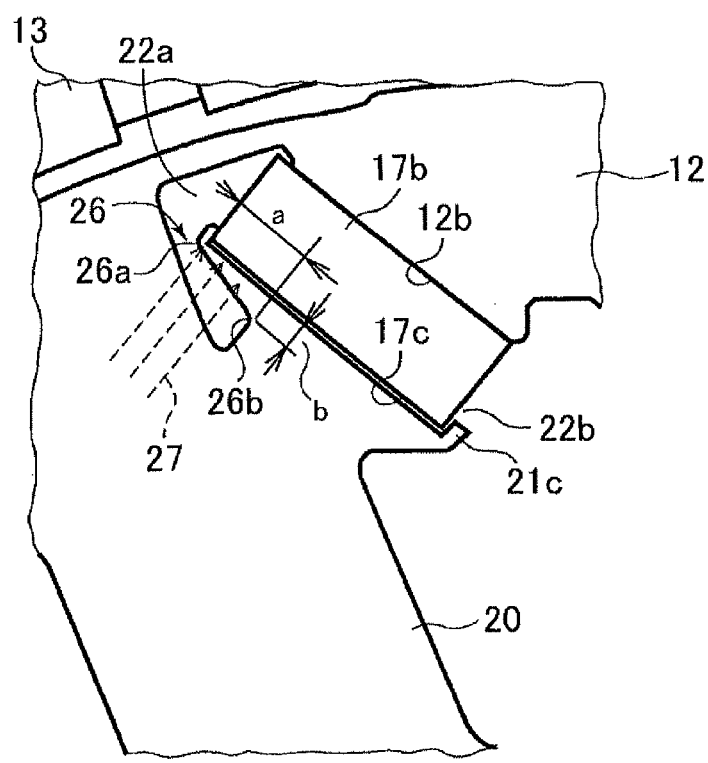
Figure 12:
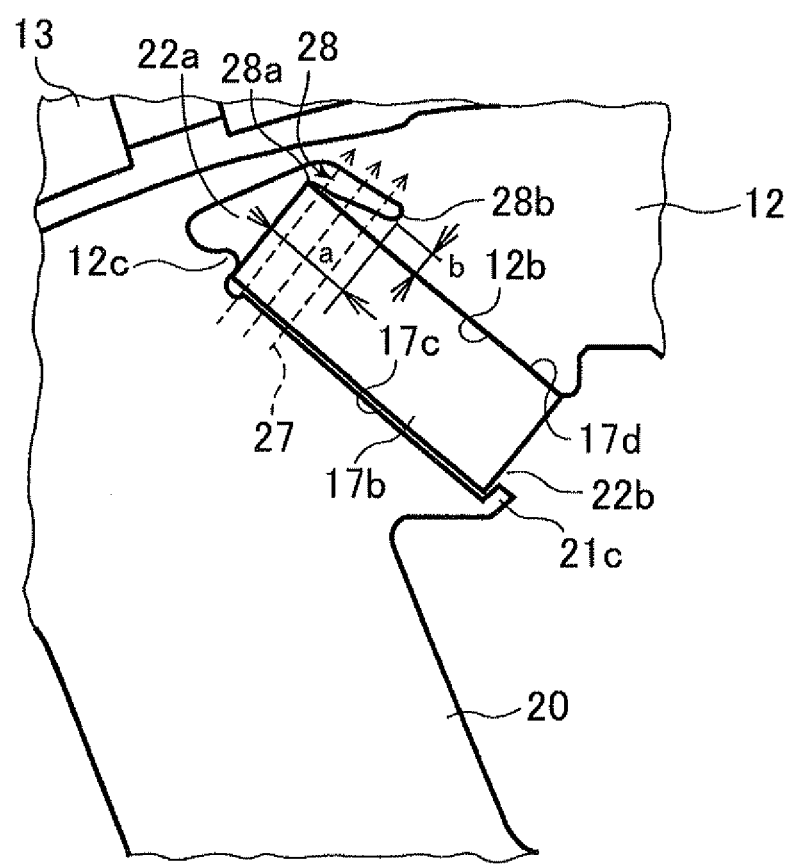
FIG. 12 illustrates the relationship between a permanent magnet and a gap portion at an outer peripheral edge portion of a rotor according to an additional modification.

Now, modifications of the above embodiment will be described with reference to FIGS. 11A, 11B, and 12. FIGS. 11A, 11B, and 12 illustrate the relationship between a permanent magnet and a gap portion at an outer peripheral edge portion of a rotor according to different modifications. The modifications are different from the configuration described above only in shape and so forth of the gap portions 25, 26, and 28, and other portions are respectively the same as those of the configuration described above. Thus, main portions are given the same reference numerals to omit duplicated descriptions.

As shown in FIG. 11A, the gap portion 25 are respectively formed, by notching, at positions corresponding to the permanent magnets 17a, 17b in the circumferential direction of the rotor 12 to extend along the inclination direction of the permanent magnets 17a, 17b. In FIG. 11A, reference numeral 25a denotes a formation start portion of the gap portion 25, and reference numeral 25b denotes a formation end portion of the gap portion 25. The gap portion 25 is formed in a generally V-shape to extend from the space portion 7 (see FIG. 1) side into the radially outer portion 12a (see FIGS. 3A and 3B) side, and formed obliquely to extend gradually away from an edge portion 17d of the permanent magnets 17a, 17b from the formation start portion 25a toward the formation end portion 25b so that the gap portion 25 is farthest from the edge portion 17d at the formation end portion 25b, at which a distance $l_{core}$ from the permanent magnet 17a to the gap portion 25 is defined.

Defining a predetermined distance (b) of the gap portions 25 from the edge portion 17d of the permanent magnets 17a, 17b as the distance $l_{core}$ from the edge portion 17d of the permanent magnets 17a, 17b to the formation end portion 25b of the gap portions 25, and defining a predetermined length of the gap portions 25 in the direction perpendicular to the distance $l_{core}$ as a distance a between the formation start portion 25a and the formation end portion 25b of the gap portions 25, that is, an overlap width $l_{mag}$ between the gap portions 25 and the permanent magnets 17a, 17b, $l_{mag}/l_{core}$ satisfies the above formula (A):

$$2.4 < l_{mag}/l_{core} < 10.0 \tag{A}$$

Likewise, as shown in FIG. 11B, defining a predetermined distance (b) of the gap portions 26 from the edge portion 17c of the permanent magnets 17a, 17b as the distance $l_{core}$ from the edge portion 17c of the permanent magnets 17a, 17b to the formation end portion 26b of the gap portions 26, and defining a predetermined length of the gap portions 26 in the direction perpendicular to the distance $l_{core}$ as a distance a between the formation start portion 26a and the formation end portion 26b of the gap portions 26, that is, an overlap width $l_{mag}$ between the gap portions 26 and the permanent magnets 17a, 17b, $l_{mag}/l_{core}$ satisfies the above formula (A):

$$2.4 < l_{mag}/l_{core} < 10.0 \tag{A}$$

Similarly, as shown in FIG. 12, defining a predetermined distance (b) of the gap portions 28 from the edge portion 17d of the permanent magnets 17a, 17b as the distance $l_{core}$ from the edge portion 17d of the permanent magnets 17a, 17b to the formation end portion 28b of the gap portions 28, and defining a predetermined length of the gap portions 28 in the direction perpendicular to the distance $l_{core}$ as a distance a between the formation start portion 28a and the formation end portion 28b of the gap portions 28, that is, an overlap width $l_{mag}$ between the gap portions 28 and the permanent magnets 17a, 17b, $l_{mag}/l_{core}$ satisfies the above formula (A):

$$2.4 < l_{mag}/l_{core} < 10.0 \tag{A}$$

Also according to the above configurations of the modifications with the gap portions 25, 26, and 28, substantially the same examination results as those of the above embodiment with the gap portions 21 are obtained. Therefore, substantially the same effects and functions as those described above can be achieved for the same reasons as those for the above embodiment.

Next, another embodiment of the present invention will be described with reference to FIGS. 13A and 13B. The embodiment is different from the configuration described above only in shape and so forth of the gap portions 21, and other portions are respectively the same as those of the configuration described above. Thus, main portions are given the same reference numerals to omit duplicated descriptions.

Figure 13A:
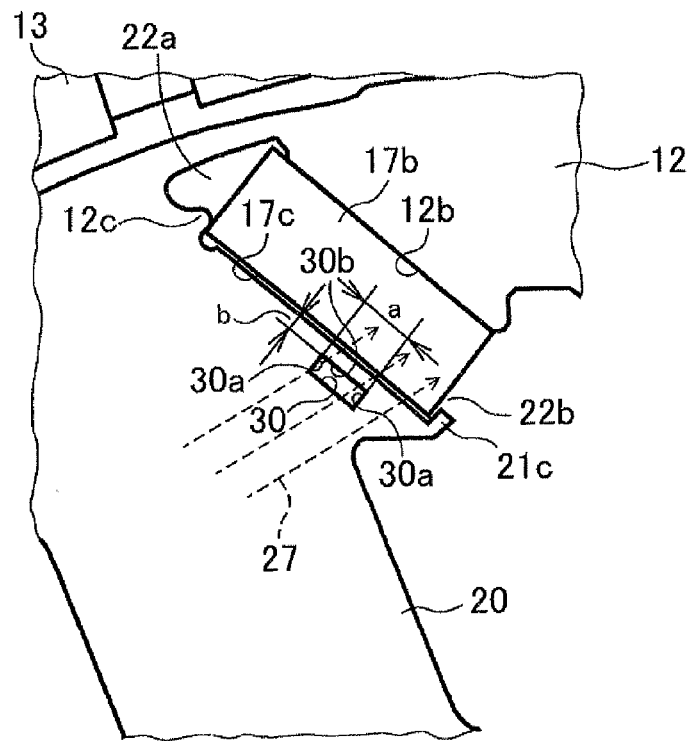
Figure 13B:
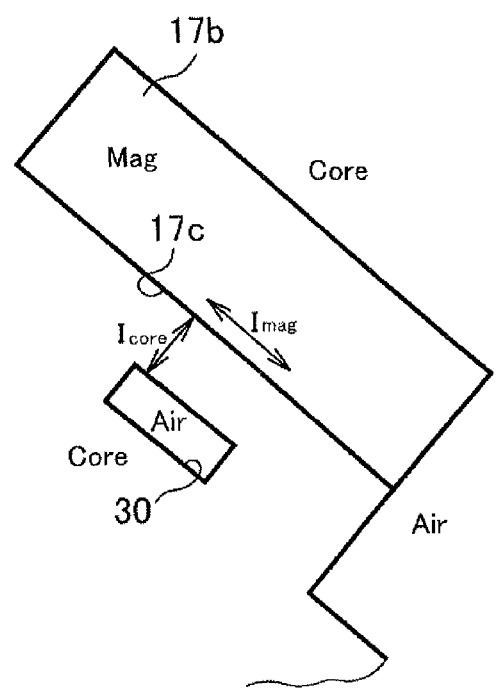

That is, in the embodiment, as shown in FIGS. 13A and 13B, gap portions 30 are respectively formed at positions corresponding to the permanent magnets 17a, 17b in the circumferential direction of the rotor 12 to extend along the inclination direction of the corresponding permanent magnets 17a, 17b and to penetrate in a rectangular shape along the axial direction of the rotary shaft 11.

While the description is made mainly about the permanent magnet 17b, the gap portion 30 corresponding to the permanent magnet 17a is formed in the opposite direction (with the opposite inclination) with respect to the gap portion 30 corresponding to the permanent magnet 17b. In FIGS. 13A and 13B, the dimension a of $l_{mag}$ may be set to 3.50 mm, for example, and the dimension b of $l_{core}$ may be set to 0.70 mm, for example.

Defining a predetermined distance of the gap portions 30 from the edge portion 17c of the permanent magnets 17a, 17b as the distance $l_{core}$ from the edge portion 17c of the permanent magnets 17a, 17b to a long side 30b of the gap portions 30 that is the closer to the edge portion 17c, and defining a predetermined length of the gap portions 30 in the direction perpendicular to the distance $l_{core}$ as a distance a between two short sides 30a of the gap portions 30, that is, an overlap width $l_{mag}$ between the gap portions 30 and the permanent magnets 17a, 17b, $l_{mag}/l_{core}$ satisfies the above formula (A):

$$2.4 < l_{mag}/l_{core} < 10.0 \qquad (A)$$

Also according to the above configuration of the embodiment with the gap portions 30, substantially the same examination results as those of the above embodiment with the gap portions 21 are obtained. Therefore, substantially the same effects and functions as those described above can be achieved for the same reasons as those for the above embodiment.

According to the embodiment, the gap portion 30 are respectively formed at positions corresponding to the permanent magnets 17a, 17b in the circumferential direction of the rotor 12 to extend along the inclination direction of the corresponding permanent magnets 17a, 17b and to penetrate in a rectangular shape. Thus, the rotary electric machine 10 with high efficiency can be realized just by forming, by notching (punching), the gap portions 30 with a predetermined shape on the radially inner side of the rotor 12 by a pressing process or the like.

The rotary electric machine according to the present invention can be used in hybrid vehicles, hybrid systems, and so forth, and is particularly suitable for use in devices that require a further reduced motor loss for further enhanced efficiency.

What is claimed is:

1. A rotary electric machine, comprising:
   a stator including a stator core formed in an annular shape and a stator coil wound around the stator core,
   a rotary shaft positioned at a center of the stator and configured to rotate about a center of rotation,
   a rotor fixed to the rotary shaft and configured to rotate about the center of rotation within the stator, and
   permanent magnets disposed about a periphery of the rotor and configured in an inverted V-shape at respective angles of inclination from a respective radius of the rotor such that a distance between pairs of magnets narrows towards a center of rotation of the rotor, wherein
   the rotor is provided with a plurality of support portions that extend radially about the center of rotation and are positioned so as to define an inner space portions between the support portions, and
   gap portions in the rotor are respectively formed in correspondence with the inner space portions at positions spaced by a predetermined distance from an edge portion of the permanent magnets in a flowing direction of magnetic flux between the permanent magnets and the stator, and are formed: (i) so as to extend along the respective angles of inclination of corresponding permanent magnets from the space portions so as to wedge into a radially outer side of the rotor, (ii) having such a predetermined length that causes magnetic saturation during generation of low torque in a low-current state in which electricity at a low current is supplied to the stator coil and that causes no magnetic saturation during generation of maximum torque in a high-current state in which electricity at a high current is supplied to the stator coil, and (iii) such that if the predetermined distance of the gap portions from the edge portion of the permanent magnets is defined as a distance $l_{core}$ from the permanent magnets to the gap portions, and the predetermined length of the gap portions in a direction perpendicular to the distance $l_{core}$ is defined as an overlap width $l_{mag}$ between the gap portions and the permanent magnets, $l_{mag}/l_{core}$ satisfies the following formula:

$$2.4 < l_{mag}/l_{core} < 10.0.$$

* * * * *